(12) United States Patent
Ramachandra et al.

(10) Patent No.: US 10,761,674 B2
(45) Date of Patent: Sep. 1, 2020

(54) SYSTEMS AND METHODS FOR PROVIDING USER-MANIPULATED PRIMARY FLIGHT DISPLAY (PFD) DATA ONBOARD AN AIRCRAFT

(71) Applicant: HONEYWELL INTERNATIONAL INC., Morris Plains, NJ (US)

(72) Inventors: Sripathi Ramachandra, Karnataka (IN); Mark Pearson, Peoria, AZ (US); PraveenKumar Ayyathurai, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 131 days.

(21) Appl. No.: 15/874,066

(22) Filed: Jan. 18, 2018

(65) Prior Publication Data
US 2019/0220152 A1  Jul. 18, 2019

(51) Int. Cl.
*G06F 3/048* (2013.01)
*G06F 3/0481* (2013.01)
*G06F 3/0484* (2013.01)
*G06F 3/0485* (2013.01)
*B64D 43/00* (2006.01)
*G06F 3/0488* (2013.01)
*G01C 23/00* (2006.01)

(52) U.S. Cl.
CPC ........... *G06F 3/0481* (2013.01); *B64D 43/00* (2013.01); *G01C 23/005* (2013.01); *G06F 3/0485* (2013.01); *G06F 3/0488* (2013.01); *G06F 3/04842* (2013.01); *G06F 3/04847* (2013.01); *G06F 2203/04806* (2013.01)

(58) Field of Classification Search
CPC ............... G06F 3/0481; G06F 3/04842; G06F 3/04847; G06F 3/0485; G06F 3/0488; G06F 2203/04806; B64D 43/00
See application file for complete search history.

(56) References Cited

U.S. PATENT DOCUMENTS

| 6,061,062 | A | * | 5/2000 | Venolia | ................. | G06F 3/0481 |
| | | | | | | 715/856 |
| 6,870,490 | B2 | | 3/2005 | Sherry et al. | | |
| 8,626,360 | B2 | | 1/2014 | Komer et al. | | |

(Continued)

FOREIGN PATENT DOCUMENTS

WO    2011017063 A2    2/2011

*Primary Examiner* — Rinna Yi
(74) *Attorney, Agent, or Firm* — Lorenz & Kopf, LLP (57) ABSTRACT

A method for providing flight data onboard an aircraft is provided. The method obtains avionics data, by a processor communicatively coupled to a display device onboard the aircraft; presents a graphical user interface (GUI), by the display device, wherein the GUI comprises at least a speed tape graphical element and an altitude tape graphical element; receives user input manipulations via a user interface communicatively coupled to the processor; executes the user input manipulations for the altitude tape graphical element or the speed tape graphical element, to generate a revised altitude tape graphical element or a revised speed tape graphical element; generates a revised GUI comprising the revised altitude tape graphical element or the revised speed tape graphical element; and presents the revised GUI, via the display device.

12 Claims, 5 Drawing Sheets (56) References Cited

U.S. PATENT DOCUMENTS

| | | | |
|---|---|---|---|
| 2009/0315834 A1* | 12/2009 | Nurmi | G06F 3/041 345/173 |
| 2010/0107062 A1* | 4/2010 | Bacus | G06F 17/212 715/269 |
| 2010/0134425 A1* | 6/2010 | Storrusten | G06F 3/0482 345/173 |
| 2011/0115822 A1* | 5/2011 | Bae | G06F 3/04883 345/661 |
| 2012/0095623 A1* | 4/2012 | Barral | G01C 23/005 701/4 |
| 2012/0206358 A1 | 8/2012 | Green et al. | |
| 2013/0033448 A1* | 2/2013 | Yano | G06F 3/0235 345/173 |
| 2013/0036382 A1* | 2/2013 | Yuan | G06F 3/04883 715/815 |
| 2013/0215023 A1 | 8/2013 | Bourret et al. | |
| 2016/0179327 A1* | 6/2016 | Zammit-Mangion | G01C 23/00 701/7 |
| 2017/0032576 A1 | 2/2017 | Mazoyer et al. | |
| 2018/0349005 A1* | 12/2018 | Bhargava | G06F 3/04883 |

* cited by examiner

FIG. 5 ns of the GUI; and at least one processor, communicatively coupled to the system memory element, the communication device, the display device, and the user interface, the at least one processor configured to: obtain avionics data, via the communication device; present a graphical user interface (GUI), via the display device, wherein the GUI comprises at least a speed tape graphical element and an altitude tape graphical element; receive user input manipulations via the user interface; execute the user input manipulations for the altitude tape graphical element or the speed tape graphical element, to generate a revised altitude tape graphical element or a revised speed tape graphical element; generate a revised GUI comprising the revised altitude tape graphical element or the revised speed tape graphical element; and present the revised GUI, via the display device.

SYSTEMS AND METHODS FOR PROVIDING USER-MANIPULATED PRIMARY FLIGHT DISPLAY (PFD) DATA ONBOARD AN AIRCRAFT

TECHNICAL FIELD

Embodiments of the subject matter described herein relate generally to presenting altered Primary Flight Data (PFD) data onboard an aircraft. More particularly, embodiments of the subject matter relate to enabling user manipulations of PFD data, and presenting results of the user manipulations.

BACKGROUND

Flight displays and aircraft onboard displays present data for use and decision-making by flight crews during flight. A Primary Flight Display (PFD), found in an aircraft equipped with an electronic flight instrument system, is generally one of the primary references for flight information. The PFD combines the information traditionally displayed on several electromechanical instruments onto a single electronic display to reduce pilot workload and to enhance situational awareness. The layout and information displayed on the PFD varies depending upon manufacturer and installation. Most PFDs are configured with a central attitude indicator (AI) and flight director surrounded by other flight parameters. Convention normally places an airspeed tape on the left side of the AI and an altitude tape on the right, and the PFD presentation is based on a current aircraft configuration. However, under certain circumstances, flight crews may wish to view PFD parameters that are out of the currently displayed range of values.

Accordingly, it is desirable to provide additional data onboard the aircraft. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for providing flight data onboard an aircraft. The method obtains avionics data, by a processor communicatively coupled to a display device onboard the aircraft; presents a graphical user interface (GUI), by the display device, wherein the GUI comprises at least a speed tape graphical element and an altitude tape graphical element; receives user input manipulations via a user interface communicatively coupled to the processor; executes the user input manipulations for the altitude tape graphical element or the speed tape graphical element, to generate a revised altitude tape graphical element or a revised speed tape graphical element; generates a revised GUI comprising the revised altitude tape graphical element or the revised speed tape graphical element; and presents the revised GUI, via the display device.

Some embodiments of the present disclosure provide a system for providing flight data onboard an aircraft. The system includes: a system memory element; a communication device configured to communicate with aircraft onboard avionics systems; a display device, configured to present a graphical user interface (GUI) graphical element onboard the aircraft, wherein the GUI comprises at least a speed tape graphical element and an altitude tape graphical element; a user interface, configured to receive user input manipula- Some embodiments of the present disclosure provide a non-transitory, computer-readable medium containing instructions thereon, which, when executed by a processor, perform a method for providing flight data onboard an aircraft. The method obtains avionics data, by the processor communicatively coupled to a display device onboard the aircraft; presents a graphical user interface (GUI), by the display device, wherein the GUI comprises at least a speed tape graphical element and an altitude tape graphical element; receives user input manipulations via a user interface communicatively coupled to the processor, wherein the user input manipulations comprise at least one of a user input zoom function and a user input scroll function; executes the user input manipulations for the altitude tape graphical element or the speed tape graphical element, to generate a revised altitude tape graphical element or a revised speed tape graphical element; generates a revised GUI comprising the revised altitude tape graphical element or the revised speed tape graphical element; and presents the revised GUI, via the display device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to systems and methods for permitting a user to manipulate graphical elements of a Primary Flight Display (PFD), and for presenting revised, updated, or otherwise changed PFD data based on the user input manipulations. More specifically, the subject matter relates to receiving user input manipulations of graphical elements of a PFD presentation, and zooming or scrolling the presented graphical elements, in response to the user input manipulations.

Certain terminologies are used with regard to the various embodiments of the present disclosure. A Primary Flight Display (PFD) is generally one of the primary references for flight information. The PFD combines the information traditionally displayed on several electromechanical instruments onto a single electronic display to reduce pilot workload and to enhance situational awareness. The PFD presentation is based on a current aircraft configuration. The PFD layout and information displayed may vary, but many PFDs are configured with a central attitude indicator (AI) and flight director surrounded by other flight parameters (e.g., a speed tape graphical element, an altitude tape graphical element). The PFD includes and presents graphical elements and text to provide flight information onboard the aircraft, during flight. The graphical elements include, but are not limited to, a speed tape graphical element and an altitude tape graphical element. A speed tape graphical element is an indicator of a current airspeed and other aircraft speed parameters, including but not limited to: a maximum envelope speed, a flap reference speed, and a minimum envelope speed. An altitude tape graphical element is an indicator of a current aircraft altitude and other altitude parameters including, but not limited to, a minimum envelope altitude, a maximum envelope altitude, or the like.

Figure 1:
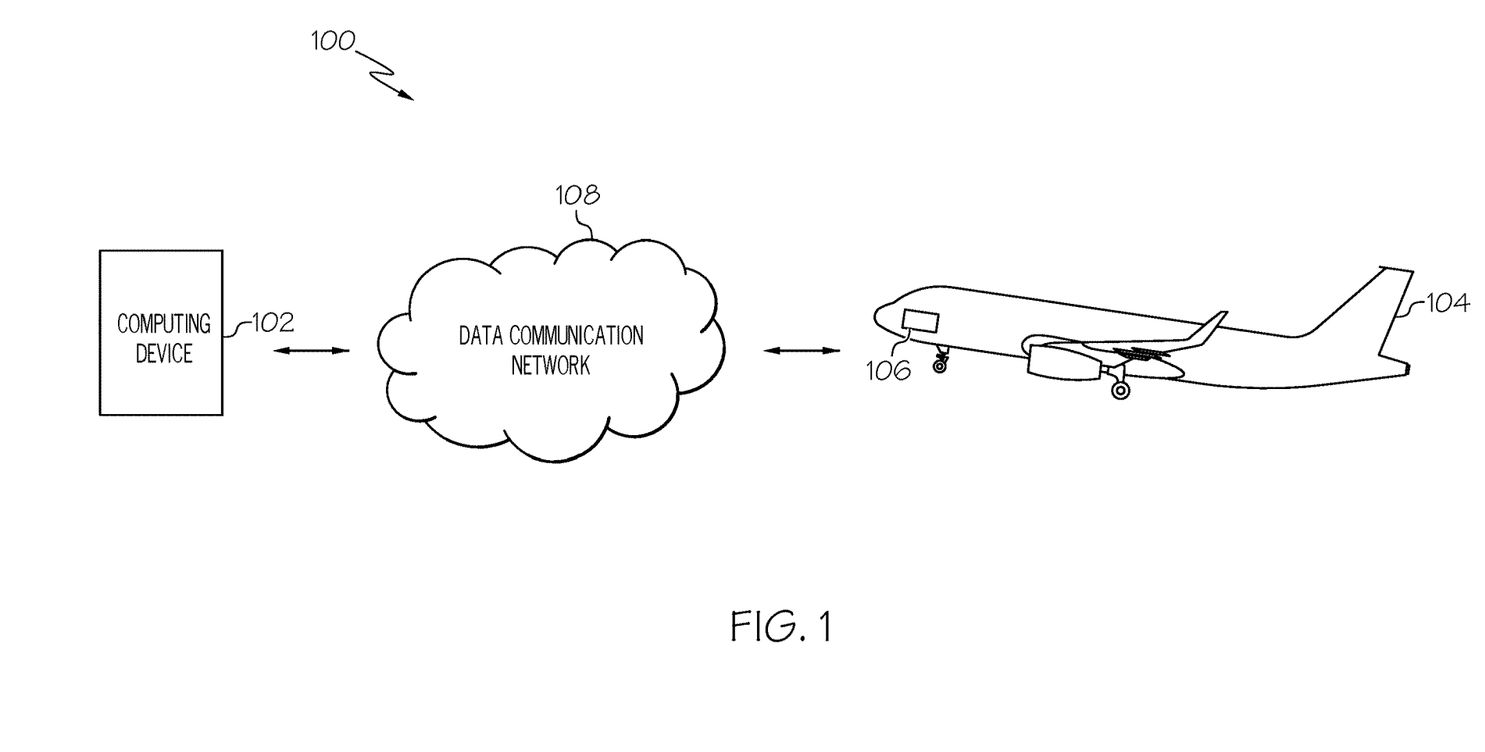
FIG. 1 is a diagram of a system for providing Primary Flight Display (PFD) data onboard an aircraft, in accordance with the disclosed embodiments.

Turning now to the figures, FIG. 1 is a diagram of a system 100 for providing Primary Flight Display (PFD) data onboard an aircraft, in accordance with the disclosed embodiments. The system 100 operates to receive user input data manipulations of graphical elements of a flight display, and to present a revised and updated flight display onboard an aircraft 104 during flight. The system 100 may include, without limitation, a computing device 102 that communicates with one or more avionics systems 106 onboard the aircraft 104, via a data communication network 108. In practice, certain embodiments of the system 100 may include additional or alternative elements and components, as desired for the particular application.

The computing device 102 may be implemented by any computing device that includes at least one processor, some form of memory hardware, a user interface, and communication hardware. For example, the computing device 102 may be implemented using a personal computing device, such as a tablet computer, a laptop computer, a personal digital assistant (PDA), a smartphone, or the like. In this scenario, the computing device 102 is capable of storing, maintaining, and executing an Electronic Flight Bag (EFB) application configured to present a Primary Flight Display (PFD) that (i) provides a visual representation of flight data, and (ii) enables user manipulation in order to provide flight data outside of the currently displayed parameters. In other embodiments, the computing device 102 may be implemented using a computer system onboard the aircraft 104, which is configured to provide the visual representation and enable the user manipulation.

The aircraft 104 may be any aviation vehicle for which flight data (e.g., a PFD display data) is relevant and applicable during flight. The aircraft 104 may be implemented as an airplane, helicopter, spacecraft, hovercraft, or the like. The one or more avionics systems 106 may include any system onboard the aircraft 104 that provides PFD data, including but not limited to: a Flight Management System (FMS), Automatic Dependent Surveillance-Broadcast (ADS-B) devices, navigation devices, weather radar, altitude sensors, speed sensors, or the like. Data obtained from the one or more avionics systems 106 may include, without limitation: flight data, aircraft performance data, aircraft speed data, aircraft altitude data, or the like.

The computing device 102 is usually located onboard the aircraft 104, and the computing device 102 communicates with the one or more avionics systems 106 via the data communication network 108 and/or via communication mechanisms onboard the aircraft 104 (e.g., via wired and/or wireless communication connection).

The data communication network 108 may be any digital or other communications network capable of transmitting messages or data between devices, systems, or components (e.g., the computing device 102 and avionics systems 106). In certain embodiments, the data communication network 108 includes a packet switched network that facilitates packet-based data communication, addressing, and data routing. The packet switched network could be, for example, a wide area network, the Internet, or the like. In various embodiments, the data communication network 108 includes any number of public or private data connections, links or network connections supporting any number of communications protocols. The data communication network 108 may include the Internet, for example, or any other network based upon TCP/IP or other conventional protocols. In various embodiments, the data communication network 108 could also incorporate a wireless and/or wired telephone network, such as a cellular communications network for communicating with mobile phones, personal digital assistants, and/or the like. The data communication network 108 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

During typical operation, the computing device 102 presents a graphical user interface (GUI) that includes graphical elements and text appropriate to, and generally presented as, a Primary Flight Display (PFD). Such PFD graphical elements include a speed tape graphical element and an altitude tape graphical element. The computing device 102 is configured to receive user input manipulations to the graphical elements, and to present updated, revised, or otherwise altered graphical elements that include user-selected parameters. For example, the computing device 102 may receive user input manipulations to zoom and/or scroll the speed tape graphical element or the altitude tape graphical element, wherein the speed tape and altitude tape are presented using a range of values applicable to a current state of the aircraft 104. In response to the user input, the computing device 102 zooms and/or scrolls the speed tape or altitude tape to present the user-selected parameters (e.g., maximum values, minimum values, a changed range of values).

Figure 2:
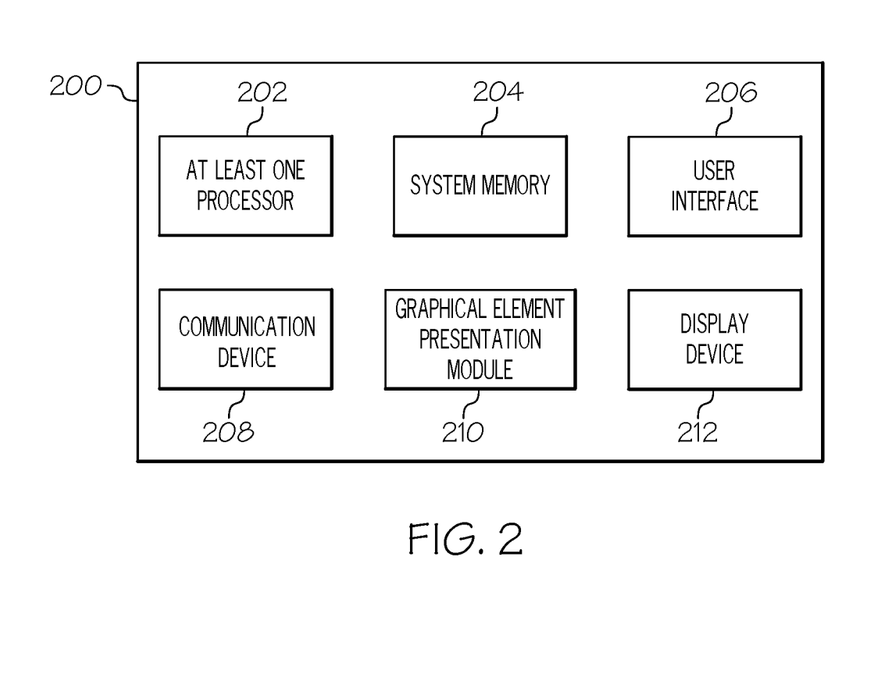
FIG. 2 is a functional block diagram of a computing device, in accordance with the disclosed embodiments.

FIG. 2 is a functional block diagram of a computing device 200, in accordance with the disclosed embodiments. It should be noted that the computing device 200 can be implemented with the computing device 102 depicted in FIG. 1. In this regard, the computing device 200 shows certain elements and components of the computing device 102 in more detail. As described previously with regard to FIG. 1, the computing device 200 may be implemented using an aircraft onboard avionics system or other computer system integrated into the aircraft, or the computing device 200 may be implemented as a personal computing device (e.g., laptop, tablet) configured to execute an Electronic Flight Bag (EFB) application to perform the functionality described herein.

The computing device 200 generally includes, without limitation: at least one processor 202; system memory 204; a user interface 206; a communication device 208; a graphical element presentation module 210; and a display device 212. These elements and features of computing device 200 may be operatively associated with one another, coupled to one another, or otherwise configured to cooperate with one another as needed to support the desired functionality—in particular, receiving user input changes to, and presenting the changes by, a graphical representation of Primary Flight Display (PFD) data, as described herein. For ease of illustration and clarity, the various physical, electrical, and logical couplings and interconnections for these elements and features are not depicted in FIG. 2. Moreover, it should be appreciated that embodiments of the computing device 200 will include other elements, modules, and features that cooperate to support the desired functionality. For simplicity, FIG. 2 only depicts certain elements that relate to the PFD data manipulation and display techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 is communicatively coupled to the system memory 204. The system memory 204 is configured to store any obtained or generated data associated with PFD data, and graphical elements associated with a PFD display. The system memory 204 may be realized using any number of devices, components, or modules, as appropriate to the embodiment. Moreover, the computing device 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computing device 200. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The user interface 206 may include or cooperate with various features to allow a user to interact with the computing device 200. Accordingly, the user interface 206 may include various human-to-machine interfaces, e.g., a keypad, keys, a keyboard, a computer mouse, buttons, switches, knobs, a touchpad, a joystick, a pointing device, a virtual writing tablet, a touch screen, a microphone, or any device, component, or function that enables the user to select options, input information, or otherwise control the operation of the computing device 200. For example, the user interface 206 could be manipulated by an operator to provide user input manipulation data (e.g., scroll and/or zoom functions) associated with PFD graphical elements, as described herein.

In certain embodiments, the user interface 206 may include or cooperate with various features to allow a user to interact with the computing device 200 via graphical elements rendered on a display element (e.g., the display device 212). Accordingly, the user interface 206 may initiate the creation, maintenance, and presentation of a graphical user interface (GUI). In certain embodiments, the display device 212 implements touch-sensitive technology for purposes of interacting with the GUI. Thus, a user can manipulate the GUI by moving a cursor symbol rendered on the display device 212, or by physically interacting with the display device 212 itself for recognition and interpretation, via the user interface 206.

The communication device 208 is suitably configured to communicate data between the computing device 200 and one or more avionics systems onboard an aircraft. The communication device 208 may transmit and receive communications over a wireless local area network (WLAN), the Internet, a satellite uplink/downlink, a cellular network, a broadband network, a wide area network, or the like. As described in more detail below, data received by the communication device 208 may include, without limitation: flight plan data, aircraft performance data, aircraft speed data, aircraft altitude data, and other data compatible with a Primary Flight Display (PFD) presentation and the computing device 200. Data provided by the communication device 208 may include, without limitation, user input manipulations of PFD graphical elements, and the like.

The graphical element presentation module 210 is configured to (i) present graphical elements and text associated with a Primary Flight Display (PFD) for an aircraft, and (ii) updating or revising the presentation of graphical elements and text, based on user input manipulations (received via the user interface 206). First, the graphical element presentation module 210 presents (via the display device 212) a PFD interface that corresponds to a typical PFD interface presented onboard an aircraft. The PFD interface includes graphical elements including, but not limited to: a speed tape graphical element and an altitude tape graphical element. Second, the graphical element presentation module 210 makes changes to the PFD graphical elements based on user input manipulations that are received via the user interface

206. For example, when a user scrolls or zooms (e.g., zoom out, zoom in) the graphical element revision module 210 changes the presentation of graphical elements to scroll or zoom the image to correspond to the user input manipulations.

In practice, the graphical element presentation module 210 may be implemented with (or cooperate with) the at least one processor 202 to perform at least some of the functions and operations described in more detail herein. In this regard, the graphical element presentation module 210 may be realized as suitably written processing logic, application program code, or the like.

The display device 212 is configured to display various icons, text, and/or graphical elements associated with a PFD presentation onboard an aircraft. In an exemplary embodiment, the display device 212 is communicatively coupled to the user interface 206, and the at least one processor 202. The at least one processor 202, the user interface 206, and the display device 212 are cooperatively configured to display, render, or otherwise convey one or more graphical representations or images associated with a PFD presentation on the display device 212, as described in greater detail below. In an exemplary embodiment, the display device 212 is realized as an electronic display configured to graphically display PFD data, as described herein.

In some embodiments, the computing device 200 is an integrated computer system onboard an aircraft, and the display device 212 is located within a cockpit of the aircraft, and is thus implemented as an aircraft display. For example, the display device 212 may be implemented as a Primary Flight Display (PFD) or Multi-Function Display (MFD) that is integrated into the aircraft. In other embodiments, the display device 212 is implemented as a display screen of a standalone, personal computing device (e.g., laptop computer, tablet computer) executing an Electronic Flight Bag (EFB) application. It will be appreciated that although the display device 212 may be implemented using a single display, certain embodiments may use additional displays (i.e., a plurality of displays) to accomplish the functionality of the display device 212 described herein.

Figure 3:
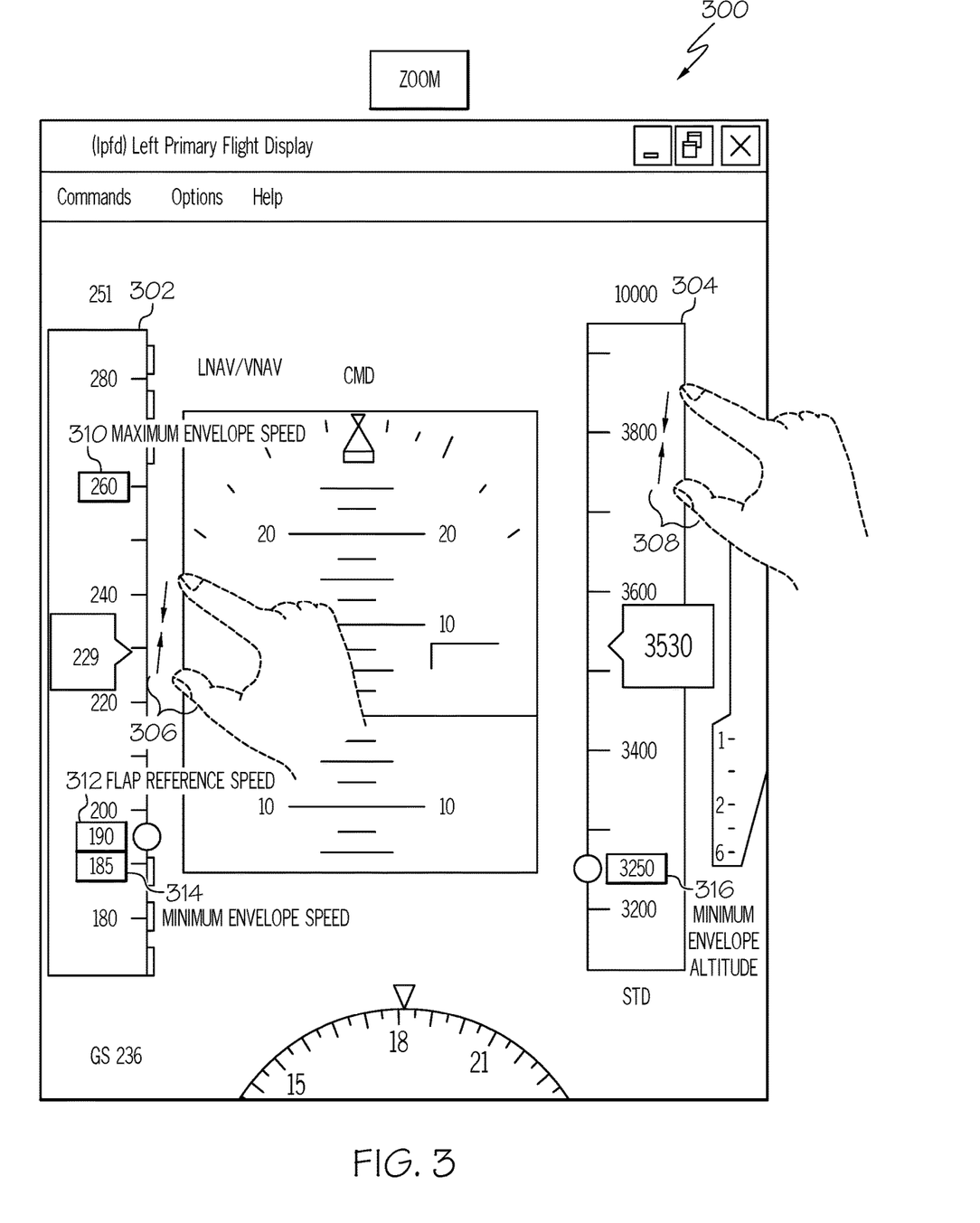
FIG. 3 is a diagram of an embodiment of a user manipulation of a Primary Flight Display (PFD), in accordance with the disclosed embodiments.

FIG. 3 is a diagram of an embodiment of a user manipulation of a Primary Flight Display (PFD) 300, in accordance with the disclosed embodiments. It should be appreciated that FIG. 3 depicts a simplified embodiment of the PFD 300, and that some implementations of the PFD 300 may include additional elements or components. The PFD 300 includes a speed tape graphical element 302 and an altitude tape graphical element 304. The speed tape graphical element 302 presents aircraft parameters, including a maximum envelope speed 310, a flap reference speed 312, a minimum envelope speed 314, and the like. The altitude tape graphical element 304 presents parameters that include a minimum envelope altitude 316, a maximum envelope altitude, or the like. The aircraft parameters presented by the speed tape graphical element 302 and the altitude tape graphical element 304 are defined by current aircraft condition data, which is obtained from a Flight Management System (FMS) onboard the aircraft.

The speed tape graphical element 302 and the altitude tape graphical element 304 may be changed by a user, via user input manipulations 306, 308. As shown, the user input manipulations 306, 308 enable the user to zoom in or zoom out of the graphical elements (e.g., the speed tape graphical element 302, the altitude tape graphical element 304) presented by the PFD 300. Through the user input manipulations 306, 307 of the PFD 300, the user is able to zoom in on a particular parameter (e.g., the maximum envelope speed 310) to view the surrounding parameters more closely, or to zoom out to view more of the parameters or additional parameters that are not currently shown via the PFD 300.

Figure 4:
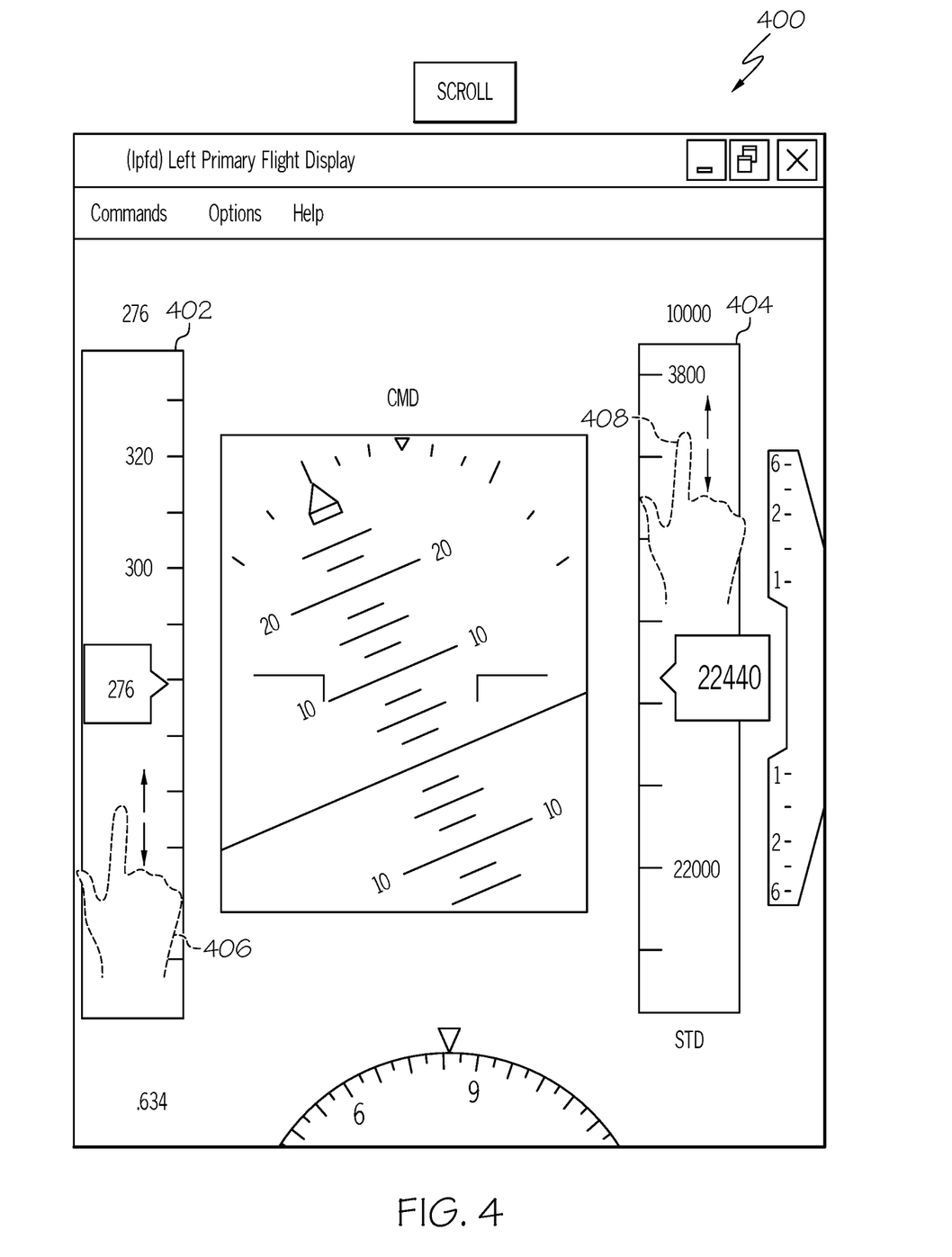
FIG. 4 is a diagram of a second embodiment of a user manipulation of a Primary Flight Display (PFD), in accordance with the disclosed embodiments.

FIG. 4 is a diagram of a second embodiment of a user manipulation of a Primary Flight Display (PFD) 400, in accordance with the disclosed embodiments. It should be appreciated that FIG. 4 depicts a simplified embodiment of the PFD 400, and that some implementations of the PFD 400 may include additional elements or components. The PFD 400 includes a speed tape graphical element 402 and an altitude tape graphical element 404, and the speed tape graphical element 402 and the altitude tape graphical element 304 present current aircraft parameters based on current aircraft conditions.

The speed tape graphical element 402 and the altitude tape graphical element 404 may be changed by a user, via user input manipulations 406, 408. As shown, the user input manipulations 406, 408 enable the user to scroll up or scroll down the presentation of the graphical elements (e.g., the speed tape graphical element 402, the altitude tape graphical element 404) presented by the PFD 400. Through the user input manipulations 406, 408 of the PFD 400, the user is able to scroll up to view a higher maximum value of the speed tape or a higher maximum value of the altitude tape, wherein the maximum value is the highest value shown at the top of the speed tape graphical element 402 or the altitude tape graphical element 404. Similarly, the user is able to scroll down to view a lower minimum value of the speed tape or a lower minimum value of the altitude tape, wherein the minimum value is the lowest value shown at the bottom of the speed tape graphical element 402 or the altitude tape graphical element 404. Thus, the scrolling feature (i.e., the user input manipulations 406, 408) enables a user to view additional aircraft parameter values that are not currently shown by the PFD 400.

Figure 5:
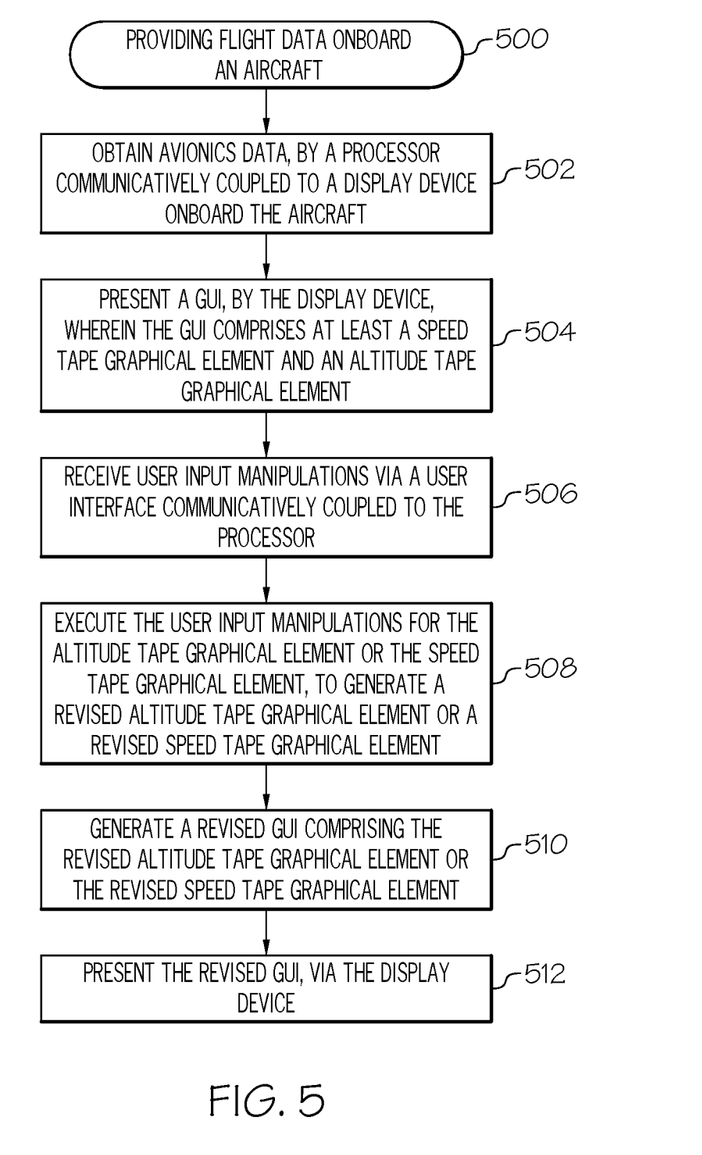
FIG. 5 is a flow chart that illustrates an embodiment of a process for providing flight data onboard an aircraft, in accordance with the disclosed embodiments.

FIG. 5 is a flow chart that illustrates an embodiment of a process 500 for providing flight data onboard an aircraft, in accordance with the disclosed embodiments. The various tasks performed in connection with process 500 may be performed by software, hardware, firmware, or any combination thereof. For illustrative purposes, the following description of process 500 may refer to elements mentioned above in connection with FIGS. 1-4. In practice, portions of process 500 may be performed by different elements of the described system. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein. Moreover, one or more of the tasks shown in FIG. 5 could be omitted from an embodiment of the process 500 as long as the intended overall functionality remains intact.

First, the process 500 obtains avionics data, by a processor communicatively coupled to a display device onboard an aircraft (step 502). Here, the process 500 obtains avionics data applicable to graphical elements and aircraft parameters associated with a Primary Flight Display (PFD). For example, the process 500 obtains aircraft speed data, aircraft altitude data, or the like. The process 500 obtains the applicable aircraft speed data and aircraft altitude data from aircraft state sensors (e.g., ADS, heading sensors) to depict speed, altitude, and heading of the aircraft by the PFD. Other aircraft speed data and altitude data (including an envelope speed and other reference speed and altitude values) are obtained from the Flight Management System (FMS) onboard the aircraft. By default, the process 500 requests the initial data parameters from the FMS, and presents the initial data parameters by the PFD. Further, the process 500 requests additional data from the FMS when the process 500 receives additional user manipulations of the graphical elements (e.g., the speed tape, the altitude tape).

Next, the process 500 presents a graphical user interface (GUI), by the display device, wherein the GUI comprises at least a speed tape graphical element and an altitude tape graphical element (step 504). The speed tape graphical element presents a maximum displayed speed value, a minimum displayed speed value, and a range of speed values between the maximum displayed speed value and the minimum displayed speed value, wherein the maximum displayed speed value is a highest speed value at the top of the speed tape graphical element, wherein the minimum displayed speed value is a lowest speed value at the bottom of the speed tape graphical element. The process 500 presents a PFD presenting a range of speed values between the maximum displayed speed value and the minimum displayed speed value.

The altitude tape graphical element presents a maximum displayed altitude value, a minimum displayed altitude value, and a range of altitude values between the maximum displayed altitude value and the minimum displayed altitude value, wherein the maximum displayed altitude value is a highest altitude value at the top of the altitude tape graphical element, wherein the minimum displayed altitude value is a lowest speed value at the bottom of the altitude tape graphical element. The process 500 presents a PFD presenting a range of altitude values between the maximum displayed altitude value and the minimum displayed altitude value.

The speed tape graphical element and the altitude tape graphical element, presented by the process 500, are configured for user manipulation. The process 500 then receives user input manipulations via a user interface communicatively coupled to the processor (step 506). In some embodiments, the user input manipulations comprise at least a user input zoom function. In some embodiments, the user input manipulations comprise at least a user input scroll function. The process 500 permits the user to zoom in or zoom out, and to scroll up and scroll down, such that a user may view the speed tape graphical element or the altitude tape graphical element more closely, such that a higher degree of granularity may be viewed within the range of speed or altitude values, and such that a user may view the speed tape graphical element or the altitude tape graphical element at a higher maximum displayed value or at a lower minimum displayed value.

In certain embodiments, the user interface comprises a user interface touchscreen, the user input manipulations comprise user touch contact with the user interface touchscreen. In other embodiments, the user interface comprises a computer mouse communicatively coupled to the display device, and the user input manipulations comprise a user manipulation of the computer mouse. In some embodiments, the process 500 executes an Electronic Flight Bag (EFB) application, and receives the user input manipulations, via the EFB application. In this example, the process 500 also presents the GUI and the revised GUI, via the EFB application.

The process 500 executes the user input manipulations for the altitude tape graphical element or the speed tape graphical element, to generate a revised altitude tape graphical element or a revised speed tape graphical element (step 508). When the user input manipulation is a zoom-in function, the user is essentially enlarging, a portion of the displayed speed or altitude values of the speed tape or the altitude tape. Here, the process 500 generates a revised speed tape graphical element by presenting a subset of a maximum displayed speed value, a minimum displayed speed value, and a range of speed values between the maximum displayed speed value and the minimum displayed speed value, based on the user manipulations; wherein the subset comprises a user-selected point of interest (POI); and wherein the revised GUI comprises the subset. The process 500 also generates a revised altitude tape graphical element by presenting a subset of a maximum displayed altitude value, a minimum displayed altitude value, and a range of altitude values between the maximum displayed altitude value and the minimum displayed altitude value, based on the user manipulations; wherein the subset comprises a user-selected point of interest (POI); and wherein the revised GUI comprises the subset.

When the user input manipulation is a zoom-out function, or a scrolling-up or scrolling-down function, the displayed speed tape or altitude tape is changed to present values outside of the displayed minimum value or the displayed maximum value. In this example, the process 500 identifies and presents a new minimum displayed value, a new maximum displayed value, and a new range that extends between the new minimum displayed value and the new maximum displayed value.

Here, the process 500 generates a revised speed tape graphical element by identifying a maximum displayed speed value, a minimum displayed speed value, and a range of speed values between the maximum displayed speed value and the minimum displayed speed value; and revising the maximum displayed speed value, the minimum displayed speed value, and the range of speed values between the maximum displayed speed value and the minimum displayed speed value, based on the user manipulations, to create a revised maximum displayed speed value, a revised minimum displayed speed value, and a revised range of speed values; wherein the revised GUI comprises the revised maximum displayed speed value, the revised minimum displayed speed value, and the revised range of speed values.

The process 500 also generates a revised altitude tape graphical element by identifying a maximum displayed altitude value, a minimum displayed altitude value, and a range of altitude values between the maximum displayed altitude value and the minimum displayed altitude value; and revising the maximum displayed altitude value, the minimum displayed altitude value, and the range of altitude values between the maximum displayed altitude value and the minimum displayed altitude value, based on the user manipulations, to create a revised maximum displayed altitude value, a revised minimum displayed altitude value, and a revised range of altitude values; wherein the revised GUI comprises the revised maximum displayed altitude value, the revised minimum displayed altitude value, and the revised range of altitude values.

The process 500 then generates a revised GUI comprising the revised altitude tape graphical element and the revised speed tape graphical element (step 510), and presents the revised GUI via the display device (step 512).

In some embodiments of the process 500, wherein the user interface comprises a user interface touchscreen, the user input manipulations comprise user touch contact with the user interface touchscreen. In this example, the process 500 detects removal of the user touch contact with the user interface touchscreen; and in response to the detected removal, replacing the revised GUI with the GUI. Here, once the user has finished manipulating the PFD graphical elements and removes his fingers from the touchscreen, the process 500 automatically removes the user-manipulated PFD graphical elements and presents the original GUI (e.g., the PFD graphical elements that have not been user-manipulated). Thus, the process 500 automatically reverts to the typical PFD presentation (i.e., the original GUI) when user-touch is not currently detected by the user interface touchscreen.

In some embodiments, the process 500 detects overlapping graphical elements or overlapping graphical element labels of the revised GUI; and presents the overlapping graphical elements or the overlapping graphical elements using distinguishing visual characteristics. Here, the process 500 enables easier viewing of the user-manipulated PFD graphical elements by highlighting, underlining, or using text-effects (e.g., bold, italic) to differentiate particular graphical elements or text that overlap due to user manipulations of the GUI.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 2 depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for providing flight data onboard an aircraft, the method comprising:
   obtaining avionics data, by a processor communicatively coupled to a display device onboard the aircraft, wherein the display device comprises a touch screen;
   presenting a graphical user interface (GUI), by the display device, wherein the GUI displays at least a speed tape graphical element and an altitude tape graphical element, wherein the speed tape graphical element presents at least a maximum displayed speed value, a flap reference speed value, a minimum displayed speed value, and a range of speed values therebetween, and the altitude tape graphical element presents a maximum displayed altitude value, a minimum displayed altitude value, and a range of altitude values therebetween, wherein one or more first indicators presented by the speed tape graphical element or the altitude tape graphical element are selected based on current aircraft condition data obtained from a flight management system, the one or more first indicators selected at least from current aircraft speed or altitude, a maximum envelope speed or altitude and a minimum envelope speed or altitude;
   receiving user input manipulations to the speed tape graphical element or the altitude tape graphical element via touch screen communicatively coupled to the processor, wherein the user input manipulations comprise at least a user input zoom-out and zoom-in functions;
   executing the user input manipulations for the altitude tape graphical element or the speed tape graphical element, to generate a revised altitude tape graphical element or a revised speed tape graphical element;
   in response to the user input zoom-out function comprising the user touch contact on the speed tape graphical element or altitude tape graphical element displayed on the touch screen, presenting a first revised GUI, via the display device, comprising the first revised speed tape graphical element or altitude tape graphical element that include a new maximum displayed speed or altitude value, a new minimum displayed speed or altitude value and a new range of speed or altitude values therebetween, wherein the new maximum displayed speed or altitude value is greater than the maximum displayed speed or altitude value and the new minimum displayed speed or altitude value is less than the minimum displayed speed or altitude value when the user input zoom-out function is executed, and wherein the revised altitude tape graphical element or the revised speed tape graphical element shows one or more second indicators, the one or more second indicators including at least one of current aircraft speed or altitude, a maximum envelope speed or altitude and a minimum envelope speed or altitude that is not shown by the speed tape graphical element or the altitude tape graphical element;
   in response to detecting removal of the user touch contact on the speed tape graphical element or altitude tape graphical element displayed on the touch screen, replacing the first revised GUI with the GUI;
   in response to the user input zoom-in function comprising the user touch contact on the speed tape graphical element or altitude tape graphical element displayed on the touch screen, presenting a second revised GUI, via the display device, comprising the second revised speed tape graphical element or altitude tape graphical element that enlarge a portion of the displayed speed or altitude values of the speed tape graphical element or altitude tape graphical element, wherein the enlarged portion of the displayed speed or altitude values of the speed tape graphical element or altitude tape graphical element present a subset of a maximum displayed speed or altitude value, the minimum displayed speed or altitude value, and the range of speed or altitude values between the maximum displayed speed value or altitude value and the minimum displayed speed value or altitude value, based on the user manipulations, wherein the subset comprises a user-selected point of interest (POI); and
   in response to detecting removal of the user touch contact on the speed tape graphical element or altitude tape graphical element displayed on the touch screen, replacing the second revised GUI with the GUI.

2. The method of claim 1, wherein the user input manipulations comprise at least a user input scroll function.

3. The method of claim 1, further comprising:
   detecting overlapping graphical elements or overlapping graphical element labels of the revised GUI; and
   presenting the overlapping graphical elements or the overlapping graphical elements using distinguishing visual characteristics.

4. A system for providing flight data onboard an aircraft, the system comprising:
   a system memory element;
   a communication device configured to communicate with aircraft onboard avionics systems;
   a display device, configured to present a graphical user interface (GUI) graphical element onboard the aircraft, wherein the GUI comprises at least a speed tape graphical element and an altitude tape graphical element, wherein the display device comprises a touch screen;
   a user interface, configured to receive user input manipulations of the GUI; and
   at least one processor, communicatively coupled to the system memory element, the communication device, the display device, and the user interface, the at least one processor configured to:
   obtain avionics data, via the communication device;
   present a graphical user interface (GUI), via the display device, wherein the GUI displays at least a speed tape graphical element and an altitude tape graphical element, wherein the speed tape graphical element presents at least a maximum displayed speed value, a flap reference speed value, a minimum displayed speed value, and a range of speed values therebetween, and the altitude tape graphical element presents a maximum displayed altitude value, a minimum displayed altitude value, and a range of altitude values therebetween, wherein one or more indicators presented by the speed tape graphical element or the altitude tape graphical element are selected based on current aircraft condition data obtained from a flight management system, the one or more first indicators selected at least from current aircraft speed or altitude, a maximum envelope speed or altitude and a minimum envelope speed or altitude;
   receive user input manipulations to the speed tape graphical element or the altitude tape graphical element via the touch screen, wherein the user input manipulations comprise at least a user input zoom-out function and zoom-in functions;
   execute the user input manipulations for the altitude tape graphical element or the speed tape graphical element to generate a revised altitude tape graphical element or a revised speed tape graphical element;

in response to the user input zoom-out function comprising the user touch contact on the speed tape graphical element or altitude tape graphical element displayed on the touch screen, present a first revised GUI, via the display device, comprising the first revised speed tape graphical element or altitude tape graphical element that include a new maximum displayed speed or altitude value, a new minimum displayed speed or altitude value and a new range of speed or altitude values therebetween, wherein the new maximum displayed speed or altitude value is greater than the maximum displayed speed or altitude value and the new minimum displayed speed or altitude value is less than the minimum displayed speed or altitude value when the user input zoom-out function is executed, and wherein the revised altitude tape graphical element or the revised speed tape graphical element shows one or more second indicators, the one or more second indicators including at least one of current aircraft speed or altitude, a maximum envelope speed or altitude and a minimum envelope speed or altitude that is not shown by the speed tape graphical element or the altitude tape graphical element;

in response to detecting removal of the user touch contact on the speed tape graphical element or altitude tape graphical element displayed on the touch screen, replace the first revised GUI with the GUI;

in response to the user input zoom-in function comprising the user touch contact on the speed tape graphical element or altitude tape graphical element displayed on the touch screen, present a second revised GUI, via the display device, comprising the second revised speed tape graphical element or altitude tape graphical element that enlarge a portion of the displayed speed or altitude values of the speed tape graphical element or altitude tape graphical element, wherein the enlarged portion of the displayed speed or altitude values of the speed tape graphical element or altitude tape graphical element present a subset of a maximum displayed speed or altitude value, the minimum displayed speed or altitude value, and the range of speed or altitude values between the maximum displayed speed value or altitude value and the minimum displayed speed value or altitude value, based on the user manipulations, wherein the subset comprises a user-selected point of interest (POI); and in response to detecting removal of the user touch contact on the speed tape graphical element or altitude tape graphical element displayed on the touch screen, replace the second revised GUI with the GUI.

5. The system of claim 4, wherein the user input manipulations comprise at least a user input scroll function.

6. The system of claim 4, wherein the display device comprises a Primary Flight Display (PFD).

7. The system of claim 4, wherein the display device comprises a computing device configured to store, maintain, and execute an Electronic Flight Bag (EFB) application.

8. The system of claim 4, wherein the user interface comprises a computer mouse communicatively coupled to the display device; and
wherein the user input manipulations comprise a user manipulation of the computer mouse.

9. A non-transitory, computer-readable medium containing instructions thereon, which, when executed by a processor, perform a method for providing flight data onboard an aircraft, the method comprising:

obtaining avionics data, by the processor communicatively coupled to a display device onboard the aircraft, wherein the display device comprises a touch screen;

presenting a graphical user interface (GUI), by the display device, wherein the GUI displays at least a speed tape graphical element and an altitude tape graphical element, wherein the speed tape graphical element presents at least a maximum displayed speed value, a flap reference speed value, a minimum displayed speed value, and a range of speed values therebetween, and the altitude tape graphical element presents a maximum displayed altitude value, a minimum displayed speed or altitude value, and a range of altitude values therebetween, wherein one or more first indicators presented by the speed tape graphical element or the altitude tape graphical element are selected based on current aircraft condition data obtained from a flight management system, the one or more first indicators selected at least from current aircraft speed or altitude, a maximum envelope speed or altitude and a minimum envelope speed or altitude;

receiving user input manipulations to the speed tape graphical element or the altitude tape graphical element via touch screen communicatively coupled to the processor, wherein the user input manipulations comprise a user input zoom-out function;

executing the user input manipulations for the altitude tape graphical element or the speed tape graphical element, to generate a revised altitude tape graphical element or a revised speed tape graphical element;

in response to the user input zoom-out function comprising the user touch contact on the speed tape graphical element or altitude tape graphical element displayed on the touch screen, presenting a first revised GUI, via the display device, comprising the first revised speed tape graphical element or altitude tape graphical element that include a new maximum displayed speed or altitude value, a new minimum displayed speed or altitude value and a new range of speed or altitude values therebetween, wherein the new maximum displayed speed or altitude value is greater than the maximum displayed speed or altitude value and the new minimum displayed speed or altitude value is less than the minimum displayed speed or altitude value when the user input zoom-out function is executed, and wherein the revised altitude tape graphical element or the revised speed tape graphical element shows one or more second indicators, the one or more second indicators including at least one of current aircraft speed or altitude, a maximum envelope speed or altitude and a minimum envelope speed or altitude that is not shown by the speed tape graphical element or the altitude tape graphical element;

in response to detecting removal of the user touch contact on the speed tape graphical element or altitude tape graphical element displayed on the touch screen, replacing the first revised GUI with the GUI;

in response to the user input zoom-in function comprising the user touch contact on the speed tape graphical element or altitude tape graphical element displayed on the touch screen, presenting a second revised GUI, via the display device, comprising the second revised speed tape graphical element or altitude tape graphical element that enlarge a portion of the displayed speed or altitude values of the speed tape graphical element or altitude tape graphical element, wherein the enlarged portion of the displayed speed or altitude values of the speed tape graphical element or altitude tape graphical element present a subset of a maximum displayed speed or altitude value, the minimum displayed speed or altitude value, and the range of speed or altitude values between the maximum displayed speed value or altitude value and the minimum displayed speed value or altitude value, based on the user manipulations, wherein the subset comprises a user-selected point of interest (POI); and in response to detecting removal of the user touch contact on the speed tape graphical element or altitude tape graphical element displayed on the touch screen, replacing the second revised GUI with the GUI.

10. The non-transitory, computer-readable medium of claim 9, wherein the method further comprises:
identifying the maximum displayed speed value, the minimum displayed speed value, and the range of speed values between the maximum displayed speed value and the minimum displayed speed value; and
revising the maximum displayed speed value, the minimum displayed speed value, and the range of speed values between the maximum displayed speed value and the minimum displayed speed value, based on the user manipulations, to create a revised maximum displayed speed value, a revised minimum displayed speed value, and a revised range of speed values;
wherein the revised GUI comprises the revised maximum displayed speed value, the revised minimum displayed speed value, and the revised range of speed values.

11. The non-transitory, computer-readable medium of claim 9, wherein the method further comprises:
identifying the maximum displayed altitude value, the minimum displayed altitude value, and the range of altitude values between the maximum displayed altitude value and the minimum displayed altitude value; and
revising the maximum displayed altitude value, the minimum displayed altitude value, and the range of altitude values between the maximum displayed altitude value and the minimum displayed altitude value, based on the user manipulations, to create a revised maximum displayed altitude value, a revised minimum displayed altitude value, and a revised range of altitude values;
wherein the revised GUI comprises the revised maximum displayed altitude value, the revised minimum displayed altitude value, and the revised range of altitude values.

12. The non-transitory, computer-readable medium of claim 9, wherein the method further comprises:
executing an Electronic Flight Bag (EFB) application, by the processor; receiving the user input manipulations, via the EFB application; and presenting the GUI and the revised GUI, via the EFB application.

* * * * *